(12) United States Patent
Weinsberg et al.

(10) Patent No.: US 10,296,634 B2
(45) Date of Patent: May 21, 2019

(54) SYSTEMS AND METHODS FOR IDENTIFYING AND GROUPING RELATED CONTENT LABELS

(71) Applicant: Facebook, Inc., Menlo Park, CA (US)

(72) Inventors: Ehud Weinsberg, Menlo Park, CA (US); Bogdan State, Menlo Park, CA (US); Amaç Herdağdelen, Mountain View, CA (US); Thomas Frederick Dimson, Stanford, CA (US); Bai Xiao, Foster City, CA (US); Danilo Torres de Sa Resende, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 496 days.

(21) Appl. No.: 14/829,522

(22) Filed: Aug. 18, 2015

(65) Prior Publication Data

US 2017/0053013 A1 Feb. 23, 2017

(51) Int. Cl.
*G06F 17/30* (2006.01)
(52) U.S. Cl.
CPC .............................. *G06F 17/30598* (2013.01)
(58) Field of Classification Search
CPC ................................................. G06F 17/30598
USPC ....................................................... 707/738
See application file for complete search history.

(56) References Cited

U.S. PATENT DOCUMENTS 7,421,441 B1 * 9/2008 Chan .................. G06F 17/30864
8,306,977 B1 * 11/2012 Gildfind .............. G06F 17/3064
707/734
8,458,174 B1 * 6/2013 Duerig .............. G06F 17/30265
707/723
8,805,845 B1 * 8/2014 Li ..................... G06F 17/30705
707/738
8,917,274 B2 * 12/2014 Ma ........................ G06T 11/206
345/440
2009/0228510 A1 * 9/2009 Slaney .............. G06F 17/30256
2010/0010982 A1 * 1/2010 Broder .............. G06F 17/30867
707/E17.014
2010/0169327 A1 * 7/2010 Lindsay ............ G06F 17/30675
707/750
2010/0287057 A1 * 11/2010 Aihara ................. G06K 7/1095
705/16
2011/0035350 A1 * 2/2011 Zwol ..................... G06F 17/241
706/52
2011/0066618 A1 * 3/2011 Sigurbjornsson .........................
G06F 17/30427
707/739
2011/0072025 A1 * 3/2011 van Zwol ......... G06F 17/30265
707/750

(Continued)

*Primary Examiner* — Thanh-Ha Dang
(74) *Attorney, Agent, or Firm* — Sheppard Mullin Richter & Hampton LLP

(57) ABSTRACT

Systems, methods, and non-transitory computer-readable media can acquire a set of labels associated with a set of content items. Each label in the set of labels can be associated with at least one content item in the set of content items. It can be determined that at least two labels, out of the set of labels, are related. The at least two labels can be determined to be related based on at least one of a co-occurrence metric associated with the at least two labels or a topic similarity metric associated with the at least two labels. One label can be selected, out of the at least two labels, as being representative of the at least two labels.

19 Claims, 11 Drawing Sheets

(56) References Cited

U.S. PATENT DOCUMENTS

| | | | |
|---|---|---|---|
| 2012/0041953 A1* | 2/2012 | Dumais | G06F 17/30707 707/739 |
| 2012/0123978 A1* | 5/2012 | Toderice | G06F 17/30799 706/12 |
| 2012/0166457 A1* | 6/2012 | Ross | G06F 17/30616 707/755 |
| 2012/0278332 A1* | 11/2012 | Wang | G06F 17/277 707/740 |
| 2014/0040387 A1* | 2/2014 | Spivack | G06F 17/3053 709/206 |
| 2014/0076475 A1* | 3/2014 | Galicia | G06F 17/289 156/64 |
| 2014/0089330 A1* | 3/2014 | Cui | G06F 17/30997 707/749 |
| 2014/0109008 A1* | 4/2014 | Zaman | G06Q 10/107 715/810 |
| 2015/0120700 A1* | 4/2015 | Holm | G06F 17/30554 707/722 |
| 2015/0154304 A1* | 6/2015 | Kang | G06F 17/30867 707/768 |
| 2015/0254311 A1* | 9/2015 | Lerner | G06F 17/30554 707/722 |
| 2016/0048544 A1* | 2/2016 | Hughes | G06F 17/30336 707/737 |
| 2016/0170610 A1* | 6/2016 | Bertram | G06Q 10/08 715/845 |
| 2016/0224686 A1* | 8/2016 | Ramanathan | G06F 17/30958 |

* cited by examiner

SYSTEMS AND METHODS FOR IDENTIFYING AND GROUPING RELATED CONTENT LABELS

FIELD OF THE INVENTION

The present technology relates to the field of providing content. More particularly, the present technology relates to techniques for identifying and grouping related content labels.

BACKGROUND

Today, people often utilize computing devices (or systems) for a wide variety of purposes. Users can use their computing devices, for example, to interact with one another, access content, share content, and create content. In some cases, users can utilize their computing devices to capture, upload, or otherwise provide content. In one example, a user of a social networking system (or service) can utilize his or her computing device to record, produce, and post content, such as text, links, images, video, or audio. In this example, the user can further provide one or more labels, such as hashtags, for the content.

Under conventional approaches to utilizing hashtags, content items can be tagged or otherwise associated with various hashtags. Often times, under conventional approaches, such hashtags can be undesirably repetitive or redundant. For instance, the user may post a particular content item with a plurality of substantially similar or related hashtag labels. In this instance, another user who views or accesses the particular content item will see the plurality of substantially similar or related hashtag labels, which can be unnecessarily repetitive or redundant for the other user. Furthermore, in some cases, conventional approaches can provide a list of trending or popular labels. However, in accordance with conventional approaches, the list can include a number of substantially similar or related labels, which can be uninteresting to users who view the list. As such, conventional approaches can create challenges for or reduce the overall user experience associated with utilizing labels such as hashtags.

SUMMARY

Various embodiments of the present disclosure can include systems, methods, and non-transitory computer readable media configured to acquire a set of labels associated with a set of content items. Each label in the set of labels can be associated with at least one content item in the set of content items. It can be determined that at least two labels, out of the set of labels, are related. The at least two labels can be determined to be related based on at least one of a co-occurrence metric associated with the at least two labels or a topic similarity metric associated with the at least two labels. One label can be selected, out of the at least two labels, as being representative of the at least two labels.

In an embodiment, the at least two labels can be determined to be related based on the co-occurrence metric. Determining that the at least two labels are related can further comprise identifying each particular content item, out of the set of content items, that is associated with the at least two labels. The co-occurrence metric associated with the at least two labels can be incremented for each particular content item that is associated with the at least two labels. It can be determined that the co-occurrence metric at least meets a specified co-occurrence threshold.

In an embodiment, the at least two labels can be determined to be related based on the co-occurrence metric. Determining that the at least two labels are related can further comprise determining a number of times in which a first label and a second label, out of the at least two labels, are associated with a node in a social graph of a social networking system. The co-occurrence metric associated with the at least two labels can be incremented based on the number of times. It can be determined that the co-occurrence metric at least meets a specified co-occurrence threshold.

In an embodiment, the node can be associated with at least one of a particular label, a particular content item, a particular entity, a particular page, a particular group, a particular event, or a particular place.

In an embodiment, the at least two labels can be determined to be related based on the topic similarity metric. Determining that the at least two labels are related can further comprise acquiring textual information associated with the set of content items. A set of topic distributions for the set of content items can be determined based on the textual information. The set of topic distributions can include a first topic distribution for a first content item in the set of content items and a second topic distribution for a second content item in the set of content items. The first topic distribution can be associated with a first label out of the at least two labels and the second topic distribution can be associated with a second label out of the at least two labels. The first label can be descriptive of the first content item and the second label can be descriptive of the second content item. The topic similarity metric can be calculated based on comparing the first topic distribution and the second topic distribution. It can be determined that the topic similarity metric at least meets a specified topic similarity threshold.

In an embodiment, the textual information associated with the set of content items can include at least one of a respective caption for each content item in the set of content items or a respective description for each content item in the set of content items.

In an embodiment, the one label can be selected based on having a highest social engagement metric with respect to the at least two labels.

In an embodiment, a suggestion to utilize the one label can be provided.

In an embodiment, the set of labels can include a set of hashtags.

In an embodiment, the set of hashtags can be determined to be trending with respect to at least one of a specified time period or a specified recent hashtag amount.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
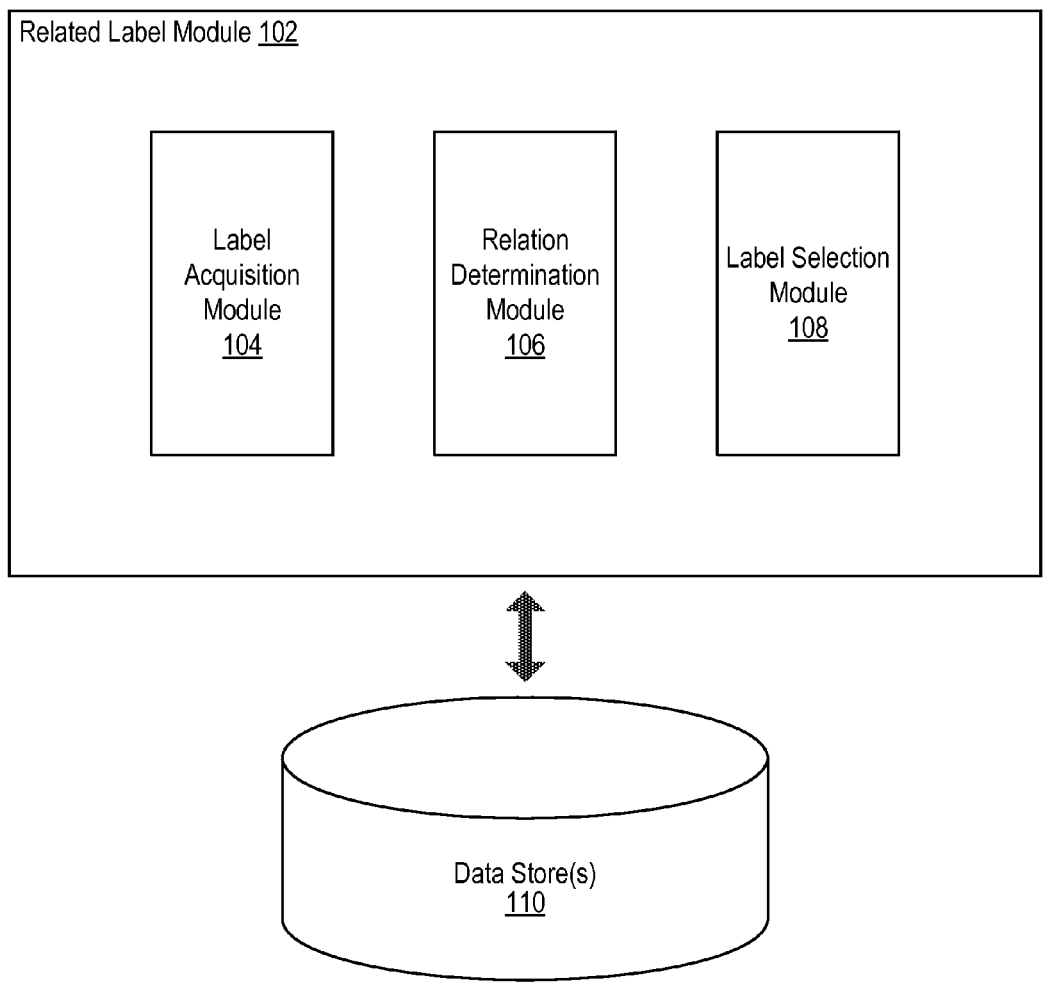
FIG. 1 illustrates an example system including an example related label module configured to facilitate identifying and grouping related content labels, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying and Grouping Related Content Labels

People use computing devices (or systems) for various purposes. Computing devices can provide different kinds of functionality. Users can utilize their computing devices to produce content, such as by writing text, taking pictures, or recording videos. Users can also use their computing devices to consume content, such as by reading articles, viewing media, or accessing web resources (e.g., web sites, online services, etc.). In some cases, users of a social networking system (or service) can use their computing devices to post or publish content via the social networking system. In some instances, the content to be posted or published via the social networking system can be tagged or labeled by the users, such as with content labels (i.e., labels for content items). For example, the content can be tagged with one or more labels such as hashtags.

Under conventional approaches to utilizing labels such as hashtags, a user can provide hashtags (or other labels) to be associated with content items or posts (e.g., status updates, links, images, videos, etc.). When another user views the content items or posts, for instance, the other user can see the hashtags associated with the content items or posts. If the other user clicks on or otherwise engages with the hashtags, the other user can be provided with additional content items that are also tagged or associated with those hashtags. However, for a particular content item, a user often times provides multiple hashtags that are substantially similar or related to each other, such that the hashtags are undesirably repetitive or redundant. Moreover, in some cases, conventional approaches can provide an identified set of labels, such as a list of trending or popular hashtags. However, in accordance with conventional approaches, the identified set of labels can include repetitive, redundant, or otherwise related labels.

Due to these or other concerns, conventional approaches can be inconvenient, inefficient, or undesirable. Therefore, an improved approach can be beneficial for addressing or alleviating various drawbacks associated with conventional approaches. The disclosed technology can identify and group related content labels. Various embodiments of the present disclosure can acquire a set of labels associated with a set of content items. Each label in the set of labels can be associated with at least one content item in the set of content items. It can be determined that at least two labels, out of the set of labels, are related. The at least two labels can be determined to be related based on at least one of a co-occurrence metric associated with the at least two labels or a topic similarity metric associated with the at least two labels. One label can be selected, out of the at least two labels, as being representative of the at least two labels. It is contemplated that there can be many variations and/or other possibilities.

FIG. 1 illustrates an example system 100 including an example related label module 102 configured to facilitate identifying and grouping related content labels, according to an embodiment of the present disclosure. As shown in the example of FIG. 1, the related label module 102 can include a label acquisition module 104, a relation determination module 106, and a label selection module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the related label module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the related label module 102 can be implemented, in part or in whole, as software running on one or more computing devices or systems, such as on a user or client computing device. For example, the related label module 102 or at least a portion thereof can be implemented as or within an application (e.g., app), a program, or an applet, etc., running on a user computing device or a client computing system, such as the user device 710 of FIG. 7. In another example, the related label module 102 or at least a portion thereof can be implemented using one or more computing devices or systems that include one or more servers, such as network servers or cloud servers. In some instances, the related label module 102 can, in part or in whole, be implemented within or configured to operate in conjunction with a social networking system (or service), such as the social networking system 730 of FIG. 7. It should be understood that there can be many variations or other possibilities.

The label acquisition module 104 can be configured to facilitate acquiring a set of labels associated with a set of content items. Each label in the set of labels can be associated with at least one content item in the set of content items. For instance, the label acquisition module 104 can acquire a list of trending or popular hashtags tagged to various posts within the social networking system. More details regarding the label acquisition module 104 will be provided below with reference to FIG. 2A.

The relation determination module 106 can be configured to facilitate determining that at least two labels, out of the set of labels, are related. In some cases, the at least two labels can be determined to be related based on at least one of a co-occurrence metric associated with the at least two labels or a topic similarity metric associated with the at least two labels. The detection module 106 will be discussed in more detail with reference to FIG. 2B.

Moreover, the label selection module 108 can be configured to facilitate selecting one label, out of the at least two labels, as being representative of the at least two labels. In some embodiments, the one label can be selected based on having a highest social engagement metric with respect to the at least two labels. The label selection module 108 can determine a respective social engagement metric for each of the at least two labels. The label selection module 108 can compare the respective social engagement metric for each of the at least two labels to determine which of the at least two labels has the highest social engagement metric. The label selection module 108 can then designate, recognize, or otherwise select the label having the highest social engagement metric as the one label that is to be representative of the at least two labels. In one example, the social engagement metric for a particular label can be determined based on at least one of a number of times the particular label has been posted (in the social networking system), a recency property associated with the posting of the particular label, a quantity of interactions (e.g., clicks, taps, shares, etc.) associated with the particular label, a quantity of distinct users who have utilized the particular label, or any combination thereof, etc. It should be appreciated that all examples herein are provided for illustrative purposes and that there can be many variations or other possibilities.

In some implementations, the label selection module 108 can be further configured to facilitate providing a suggestion to utilize the one label. In one example, the social networking system can detect that a user is posting a particular hashtag. The disclosed technology can have already determined that the one label (e.g., hashtag) is suitable to be representative of the particular hashtag. For instance, the relation determination module 106 can have determined that the particular hashtag and the one label are related to one another, such that the one label can represent the particular hashtag. As such, the one label can be suggested, such as via a type-ahead, to the user to be utilized instead of the particular hashtag. In another example, the one label can be provided as a suggestion, instead of the particular hashtag, for a label search or query. The disclosed technology can thus reduce undesirable redundancy or repetitiveness.

Furthermore, in some embodiments, the related label module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the related label module 102, such as by storing labels, their associations, and their properties. Again, it is contemplated that there can be many variations or other possibilities.

Figure 2A:
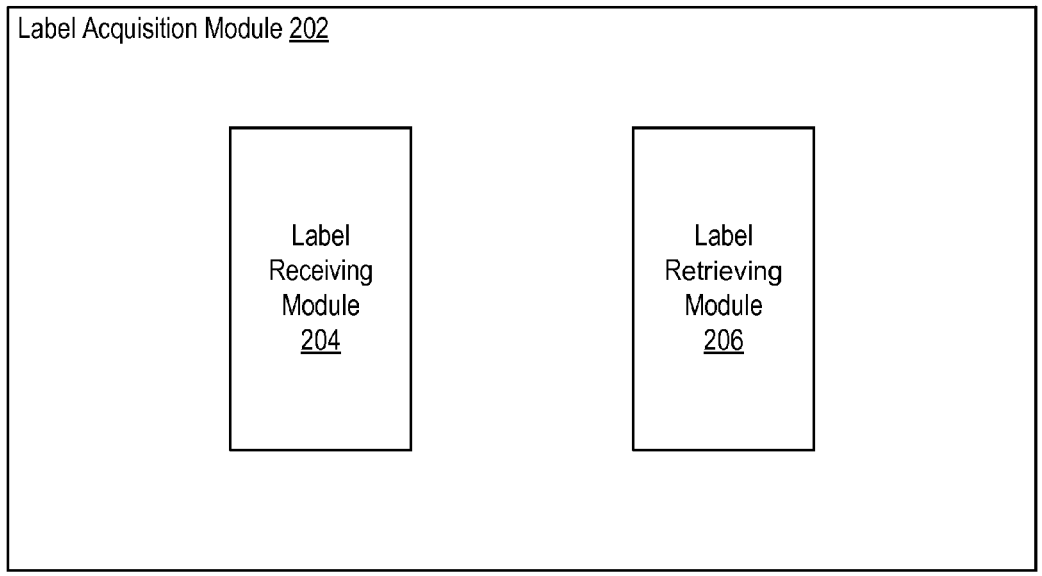
FIG. 2A illustrates an example label acquisition module configured to facilitate identifying and grouping related content labels, according to an embodiment of the present disclosure.

FIG. 2A illustrates an example label acquisition module 202 configured to facilitate identifying and grouping related content labels, according to an embodiment of the present disclosure. In some embodiments, the label acquisition module 104 of FIG. 1 can be implemented as the example label acquisition module 202. As shown in FIG. 2A, the label acquisition module 202 can include a label receiving module 204 and a label retrieving module 206.

As discussed previously, the label acquisition module 202 can facilitate acquiring a set of labels associated with a set of content items. In some embodiments, the label acquisition module 202 can utilize the label receiving module 204 to receive or otherwise acquire the set of labels associated with the set of content items. In some embodiments, the label acquisition module 202 can utilize the label retrieving module 206 to retrieve, pull, fetch, or otherwise acquire the set of labels associated with the set of content items. Each label in the set of labels can be associated with at least one content item in the set of content items. In some cases, the set of labels can include a set of hashtags. For instance, each label can correspond to a distinct hashtag and each distinct hashtag can be tagged to one or more content items in the set of content items, which can include status updates, images, videos, audio clips, links, and/or other posts within a social networking system.

In some implementations, the social networking system can identify or determine a list of trending or popular hashtags, topics, concepts, and/or other labels, etc. In some cases, the hashtags, topics, concepts, and/or other labels, etc., can be determined to be trending or popular over a specified time period (e.g., over the past hour, over the past day, over the past week, over a particular day, over a particular week, over a particular month, etc.). In some instances, the hashtags, topics, concepts, and/or other labels, etc., can be determined to be trending or popular out of a specified amount of recent labels. Accordingly, the set of hashtags can, for example, be determined to be trending with respect to at least one of a specified time period (e.g., trending over the past 48 hours) or a specified recent hashtag amount (e.g., trending out of the most recent 100,000 hashtags). In some cases, the social networking system can then provide the list of hashtags, topics, concepts, and/or other labels, etc., to be received, retrieved, or otherwise acquired by the label receiving module 204 and/or the label retrieving module 206. It should be understood that many variations are possible.

Figure 2B:
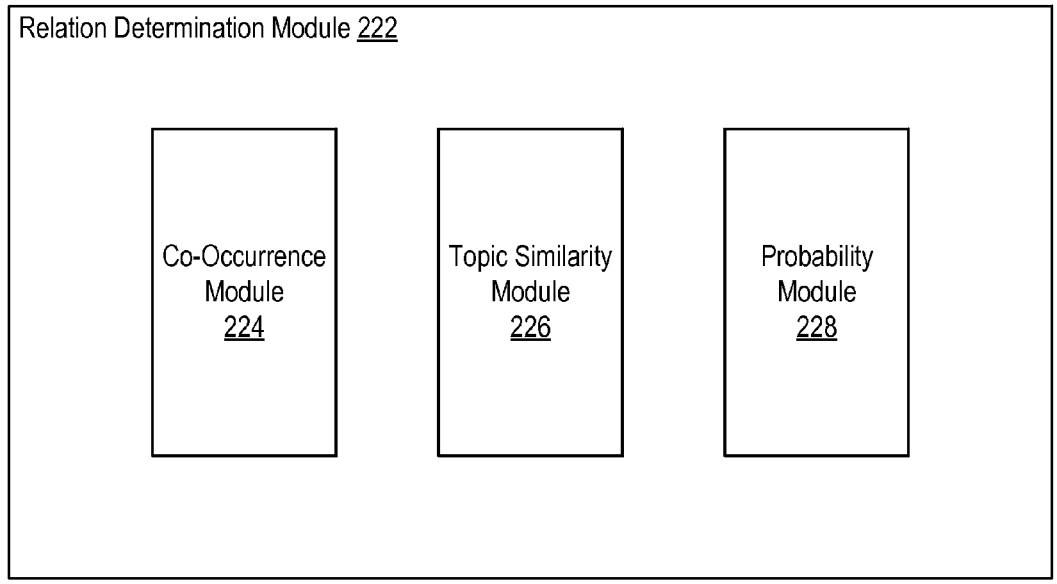
FIG. 2B illustrates an example relation determination module configured to facilitate identifying and grouping related content labels, according to an embodiment of the present disclosure.

FIG. 2B illustrates an example relation determination module 222 configured to facilitate identifying and grouping related content labels, according to an embodiment of the present disclosure. In some embodiments, the relation determination module 106 of FIG. 1 can be implemented as the example relation determination module 222. As shown in FIG. 2B, the relation determination module 222 can include a co-occurrence module 224, a topic similarity module 226, and a probability module 228.

As discussed above, the relation determination module 222 can facilitate determining that at least two labels, out of a set of labels, are related. In some cases, the at least two labels can be related when they are the same, substantially similar, repetitive, redundant, and/or duplicative, etc. In one example, labels can be related when one label is a misspelling of another (e.g., #February and #Februray can be related). In another example, labels can be related when they are generally synonymous (e.g., #valentinesday, #vday, and #valentines can all be related). In a further example, labels can be related when they refer to the same idea, event, occasion, incident, and/or subject matter, etc. (e.g., #giants, #worldseries, #sanfrancisco, and #parade can all be related during a particular time frame). Again, all examples provided herein are for illustrative purposes and many variations are possible.

In some embodiments, the relation determination module 222 can utilize the co-occurrence module 224 to determine that the at least two labels are related. In some cases, the co-occurrence module 224 can cause each particular content item, out of a set of content items, that is associated with the at least two labels to be identified. For instance, each image, video, status update, or other post that is tagged with the at least two labels can be identified (over time). In other words, each content item in which the at least two labels co-occur, coexist, and/or are tagged together, etc., can be identified (e.g., over a maximum time period, over a specified time period, etc.). The co-occurrence module 224 can then increment, for each particular content item that is associated with the at least two labels, the co-occurrence metric associated with the at least two labels. The co-occurrence metric associated with the at least two labels can, for example, include a co-occurrence count indicating the number of times that the at least two labels co-occur, coexist, and/or are tagged together, etc. The co-occurrence module 224 can further determine that the co-occurrence metric at least meets a specified co-occurrence threshold, such as a defined or preset minimum quantity, proportion, or ratio. As a result, the co-occurrence module 224 can determine or recognize that the at least two labels are related.

In some instances, the co-occurrence module 224 can determine a number of times in which a first label and a second label, out of the at least two labels, are associated with a node in a social graph of a social networking system. Examples of the node can include, but are not limited to, a particular label, a particular content item, a particular entity, a particular page, a particular group, a particular event, and/or a particular place, etc. The co-occurrence module 224 can then increment, based on the number of times, the co-occurrence metric associated with the at least two labels. The co-occurrence module 224 can further determine that the co-occurrence metric at least meets a specified co-occurrence threshold, such as a defined or preset minimum quantity, proportion, or ratio. Accordingly, the co-occurrence module 224 can determine or recognize that the at least two labels are related. More details regarding co-occurrence are described in U.S. patent application Ser. No. 12/347,473, filed Dec. 31, 2008, entitled "TRACKING SIGNIFICANT TOPICS OF DISCOURSE IN FORUMS", which is hereby incorporated by reference herein in its entirety.

In some implementations, the relation determination module 222 can utilize the topic similarity module 226 to determine that the at least two labels are related. In some cases, the topic similarity module 226 can cause textual information associated with a set of content items to be acquired. The textual information associated with the set of content items can, for example, include at least one of a respective caption for each content item in the set of content items or a respective description for each content item in the set of content items. The topic similarity module 226 can cause a set of topic distributions for the set of content items to be determined based on the textual information, such as via a topic tagger/identification system. The set of topic distributions can include a first topic distribution for a first content item in the set of content items and a second topic distribution for a second content item in the set of content items. The topic similarity module 226 can also associate the first topic distribution with a first label out of the at least two labels and the second topic distribution with a second label out of the at least two labels. The first label can be descriptive of the first content item and the second label can be descriptive of the second content item. The topic similarity module 226 can further calculate the topic similarity metric based on comparing the first topic distribution and the second topic distribution. For instance, the topic similarity metric can include a confidence score that indicates or estimates how similar the first topic distribution and the second topic distribution are with respect to each other. Moreover, the topic similarity module 226 can determine that the topic similarity metric at least meets a specified topic similarity threshold, such as a defined or preset minimum score, value, or level. As such, the topic similarity module 226 can determine or recognize that the at least two labels are related.

In some implementations, various metrics utilized with the disclosed technology can be determined based on calculating or evaluating cosine distances between vectors (e.g., co-occurrence vectors, topic distribution vectors, etc.). In some cases, the vectors can be weighted. It is contemplated that many variations are possible.

Furthermore, in some embodiments, the relation determination module 222 can utilize the probability module 228 to cause a set of K labels to be identified such that the set includes K labels that are important, novel, and diverse (i.e., with reduced redundancy and reduced repetitiveness, etc.). In some cases, a particular label in this set can be representative of at least two labels that are determined to be related.

In some implementations, the probability module 228 can utilize various algorithms and probabilities, such as a probability $P^H$ of observing a particular hashtag now (or within a specified time period) and a probability $P_0^H$ of observing the particular hashtag in general (or in the past). The ratio $$\frac{P^H}{P_0^H}$$

can be associated with a novelty aspect of the particular hashtag. The probability module 228 can utilize the point-wise Kullback-Leibler (KL) divergence function (i.e., point-wise information gain)

$$P^H \log_b \frac{P^H}{P_0^H},$$

which can be associated with an importance aspect and the novelty aspect of the particular hashtag. In some cases, the set of K labels can include a first hashtag through a K-th hashtag $h_K$, where $H=\{h_1, \ldots, h_K\}$. The probability module 228 can utilize the Hunter-Worsley probability bound, which states that $P^H \leq \Sigma_{h \in H} P^h - \alpha \Sigma_{(i,j) \in T} P^{h_i,h_j}$. As such, the joint probability $P^H$ is less than or equal to the sum, over all hashtags in H, of the unigram probability for the hashtag h minus the sum over some set of bigram probabilities T, where the set T includes (i,j).

In some embodiments, the probability module 228 can select or identify a particular label (or a particular hashtag) out of the set of labels (or a set of hashtags) that has the least contribution to the information gain. For the particular label, the probability module 228 can attempt to identify another label that replaces the particular label and that also improves the information gain. In order to identify a subset of labels that is optimal or improved with respect to importance, novelty, and diversity, the probability module 228 can plug in various labels to the function $$P^H \log_b \frac{P^H}{P_0^H}$$

in attempt to maximize the function. The subset of labels used to maximize the function can correspond to an optimal or improved subset of labels, with respect to the importance, novelty, and diversity aspects. Additionally, in some cases, the log base b can be tunable to adjust a weight for the novelty aspect and the variable ∝ can be tunable to adjust a weight for the diversity aspect. In some instances, the co-occurrence metric and/or the topic similarly metric can also be associated with the diversity aspect. It should be understood that many variations are possible.

Figure 3:
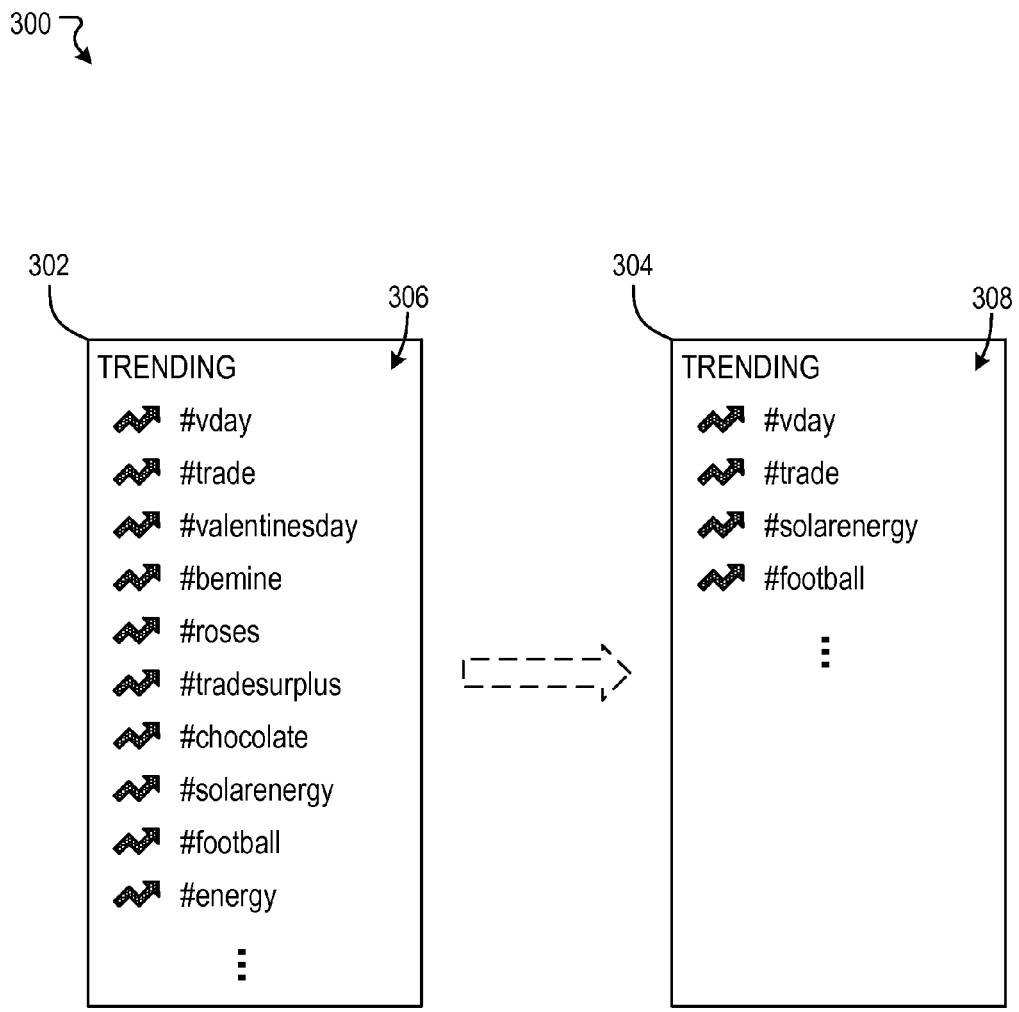
FIG. 3 illustrates an example scenario associated with identifying and grouping related content labels, according to an embodiment of the present disclosure.

FIG. 3 illustrates an example scenario 300 associated with identifying and grouping related content labels, according to an embodiment of the present disclosure. As shown, the example scenario 300 illustrates a first interface portion 302 of a social networking system (e.g., the social networking system 730 of FIG. 7) and a second interface portion 304.

In the example scenario 300 of FIG. 3, the first interface portion 302 can provide or present a first list 306 of trending labels, such as hashtags, prior to utilizing the disclosed technology. In the first list 306, many hashtags can be related (e.g., substantially similar, within an allowable deviation of being the same, etc.). For instance, the hashtags #vday, #valentinesday, #bemine, #roses, and #chocolate can all be related, while the hashtags #trade and #tradesurplus can also be related. The hashtags #solarenergy and #energy can further be related. In this instance, the hashtag #football is not related to any other hashtag in the first list 306.

The example scenario 300 further illustrates the second interface portion 304, which can correspond to the first interface portion 302 subsequent to the disclosed technology being utilized. The second interface portion 304 can provide or present a second list 308 of trending labels, such as hashtags, subsequent to utilizing the disclosed technology. The each group or cluster of hashtags in the first list 306 that has been determined by the disclosed technology to be related can be replaced by a respective representative hashtag. As shown in the example scenario 300, the second list 308 can include #vday to represent #vday, #valentinesday, #bemine, #roses, and #chocolate. The second list 308 can also include #trade to represent #trade and #tradesurplus. Moreover, the second list 308 can include #solarenergy to represent #solarenergy and #energy. The second list 308 can further include #football. As discussed, it should be appreciated that all examples provided herein are for illustrative purposes and that many variations are possible.

Figure 4:
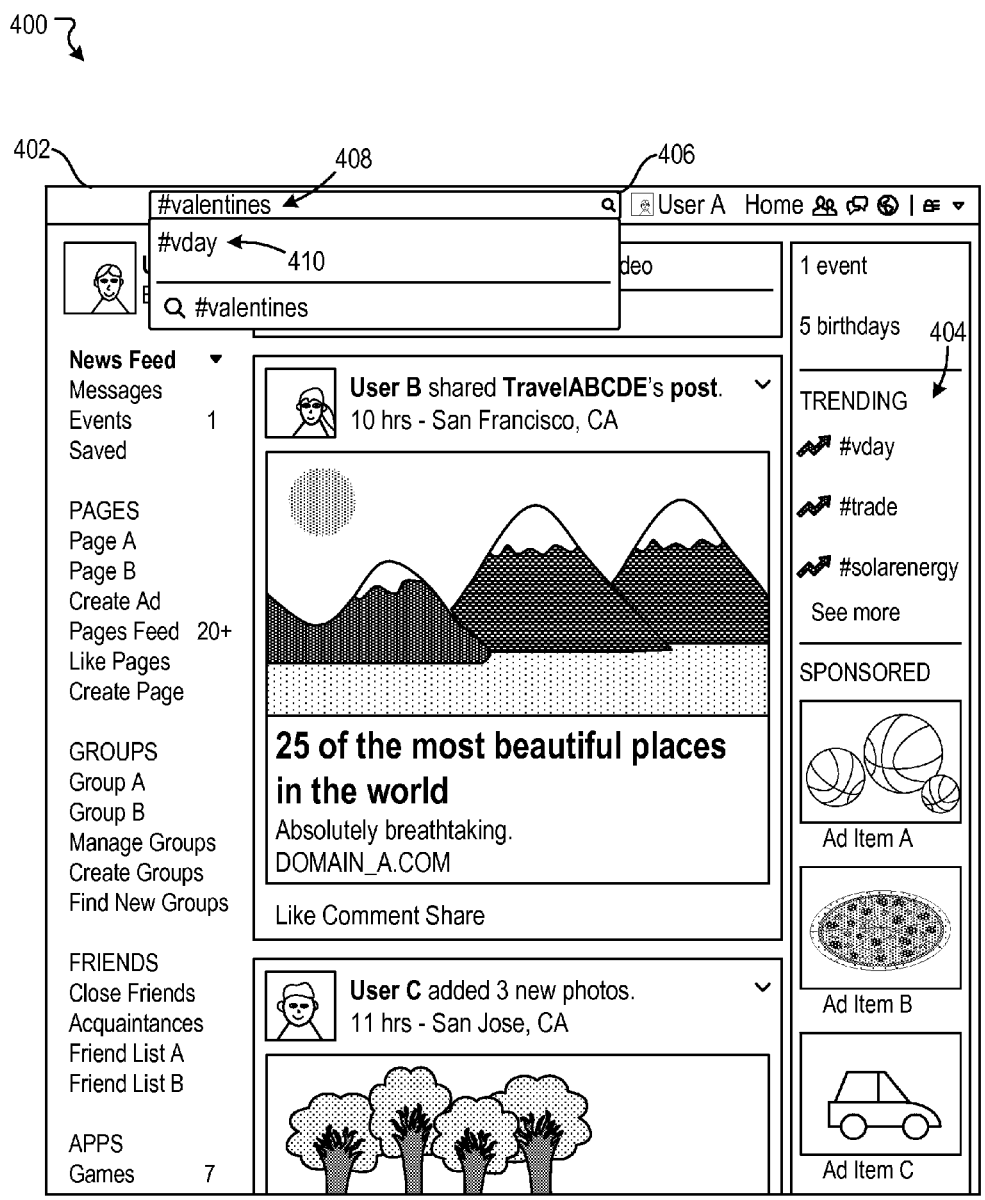
FIG. 4 illustrates an example scenario associated with identifying and grouping related content labels, according to an embodiment of the present disclosure.

FIG. 4 illustrates an example scenario 400 associated with identifying and grouping related content labels, according to an embodiment of the present disclosure. The example scenario 400 illustrates an example interface 402 associated with a social networking system (e.g., the social networking system 730 of FIG. 7). As shown in FIG. 4, the example interface 402 can include a particular interface portion for providing a list 404 of trending labels or hashtags selected and provided using the disclosed technology.

Furthermore, in the example scenario 400, the interface 402 can also provide a search bar or tool 406. As shown in this example, a user has inputted a search term, #valentines 408. The disclosed technology can determine that the term #valentines 408 is included in a particular group or cluster of related hashtags represented by a particular hashtag, #vday. Accordingly, the disclosed technology can provide or present the representative hashtag #vday 410 as a suggestion or recommendation for the user's search. Again, all examples herein are provided for illustrative purposes and many variations are possible.

Figure 5:
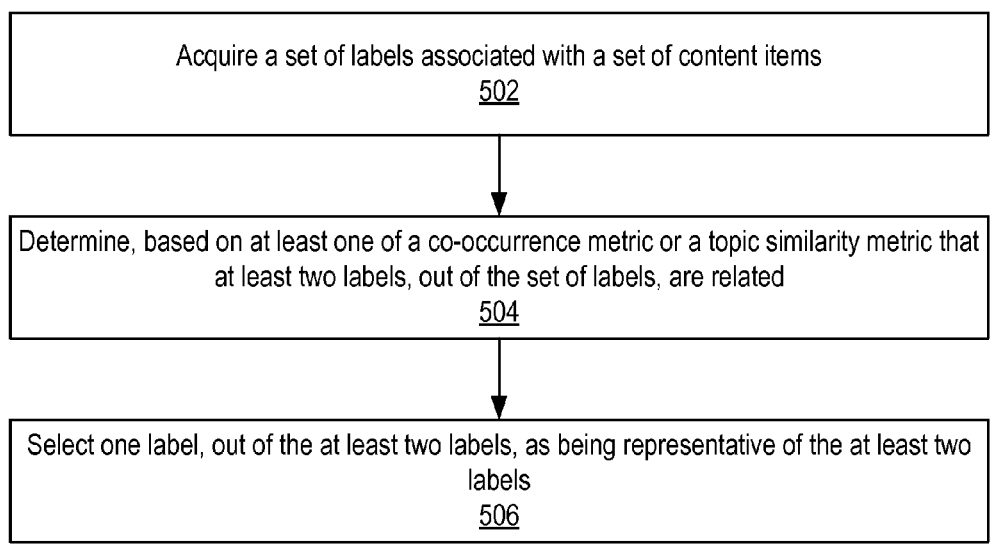
FIG. 5 illustrates an example method associated with identifying and grouping related content labels, according to an embodiment of the present disclosure.

FIG. 5 illustrates an example method 500 associated with identifying and grouping related content labels, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire a set of labels associated with a set of content items. Each label in the set of labels can be associated with at least one content item in the set of content items. At block 504, the example method 500 can determine that at least two labels, out of the set of labels, are related. The at least two labels can be determined to be related based on at least one of a co-occurrence metric associated with the at least two labels or a topic similarity metric associated with the at least two labels. At block 506, the example method 500 can select one label, out of the at least two labels, as being representative of the at least two labels.

Figure 6A:
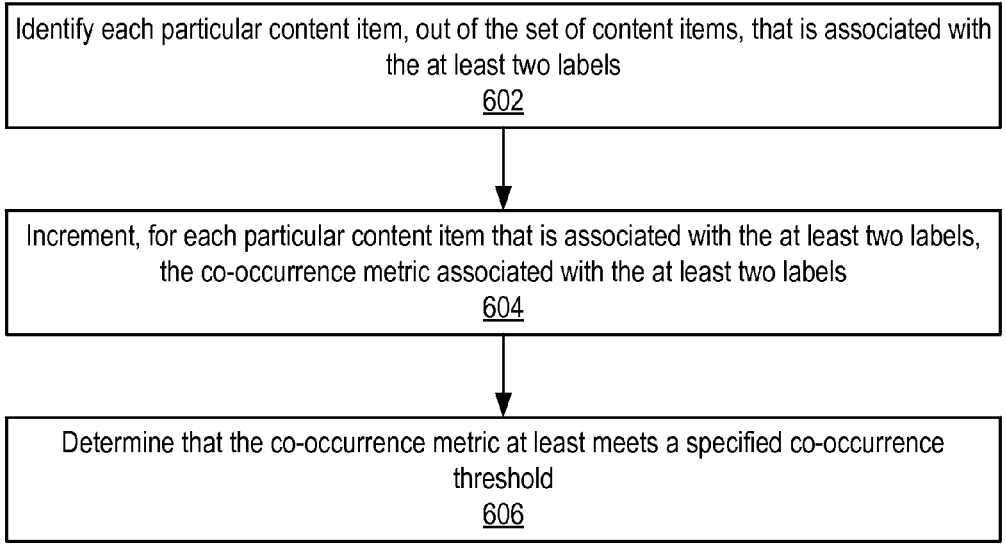
FIG. 6A illustrates an example method associated with identifying and grouping related content labels, according to an embodiment of the present disclosure.

FIG. 6A illustrates an example method 600 associated with identifying and grouping related content labels, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can identify each particular content item, out of the set of content items, that is associated with the at least two labels. At block 604, the example method 600 can increment, for each particular content item that is associated with the at least two labels, the co-occurrence metric associated with the at least two labels. At block 606, the example method 600 can determine that the co-occurrence metric at least meets a specified co-occurrence threshold.

Figure 6B:
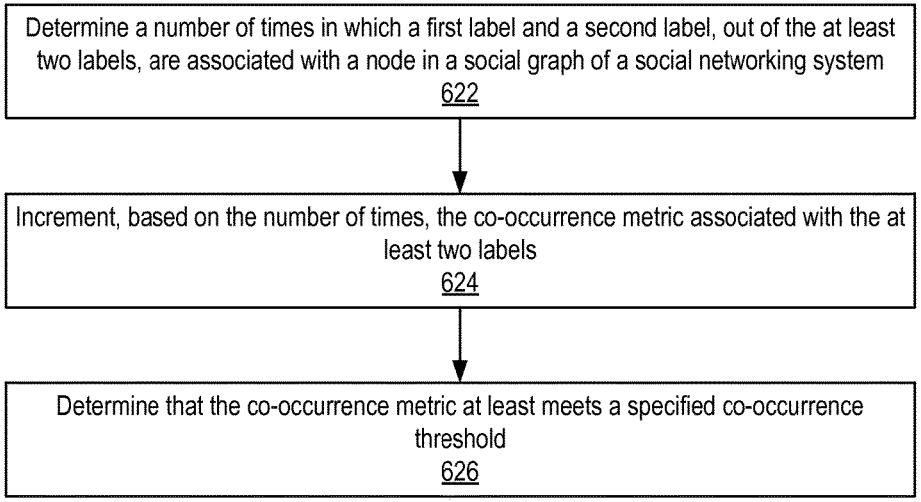
FIG. 6B illustrates an example method associated with identifying and grouping related content labels, according to an embodiment of the present disclosure.

FIG. 6B illustrates an example method 620 associated with identifying and grouping related content labels, according to an embodiment of the present disclosure. It is contemplated that there can be additional, fewer, or alternative steps performed in similar or alternative orders, or in parallel, within the scope of the various embodiments unless otherwise stated.

At block 622, the example method 620 can determine a number of times in which a first label and a second label, out of the at least two labels, are associated with a node in a social graph of a social networking system. At block 624, the example method 620 can increment, based on the number of times, the co-occurrence metric associated with the at least two labels. At block 626, the example method 620 can determine that the co-occurrence metric at least meets a specified co-occurrence threshold.

Figure 6C:
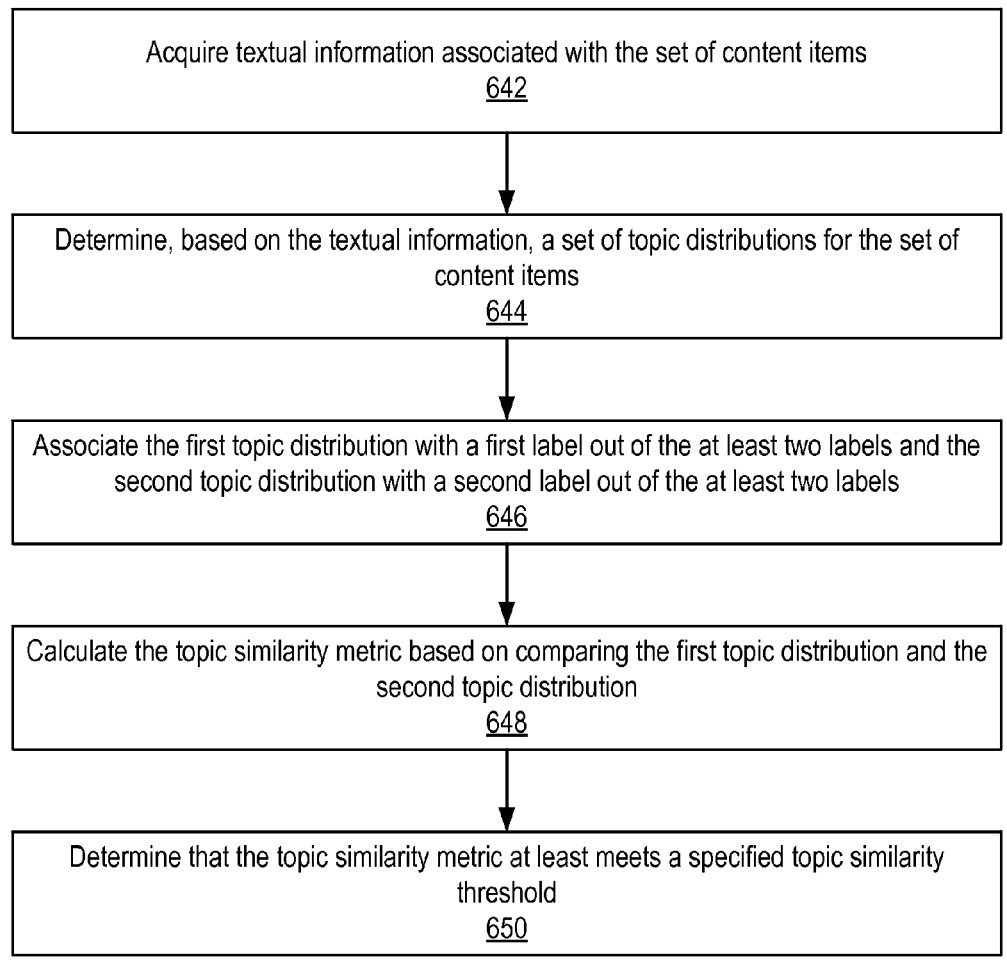
FIG. 6C illustrates an example method associated with identifying and grouping related content labels, according to an embodiment of the present disclosure.

FIG. 6C illustrates an example method 640 associated with identifying and grouping related content labels, according to an embodiment of the present disclosure. Again, it should be understood that there can be additional, fewer, or alternative steps performed in similar or alternative orders, or in parallel, within the scope of the various embodiments unless otherwise stated.

At block 642, the example method 640 can acquire textual information associated with the set of content items. At block 644, the example method 640 can determine, based on the textual information, a set of topic distributions for the set of content items. The set of topic distributions can include a first topic distribution for a first content item in the set of content items and a second topic distribution for a second content item in the set of content items. At block 646, the example method 640 can associate the first topic distribution with a first label out of the at least two labels and the second topic distribution with a second label out of the at least two labels. The first label can be descriptive of the first content item and the second label can be descriptive of the second content item. At block 648, the example method 640 can calculate the topic similarity metric based on comparing the first topic distribution and the second topic distribution. At block 650, the example method 640 can determine that the topic similarity metric at least meets a specified topic similarity threshold.

It is contemplated that there can be many other uses, applications, features, possibilities, and/or variations associated with the various embodiments of the present disclosure. For example, in some instances, the disclosed technology can be applied or utilized with subject matter other than labels. Moreover, in some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
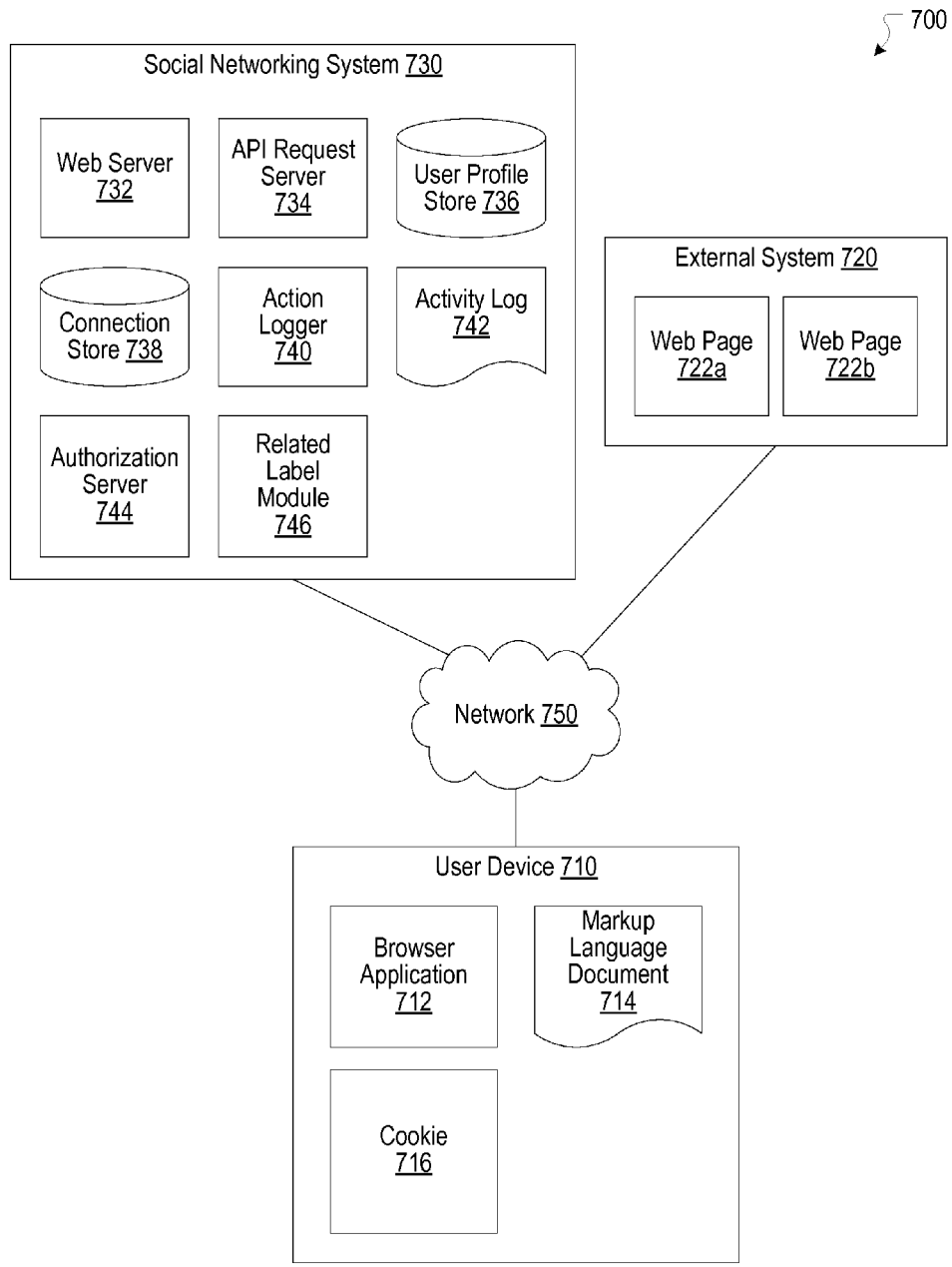
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a related label module 746. The related label module 746 can, for example, be implemented as the related label module 102 of FIG. 1. As discussed previously, it should be appreciated that there can be many variations or other possibilities. For example, in some instances, the related label module 746 (or at least a portion thereof) can be included in the user device 710. Other features of the related label module 746 are discussed herein in connection with the related label module 102.

Hardware Implementation

Figure 8:
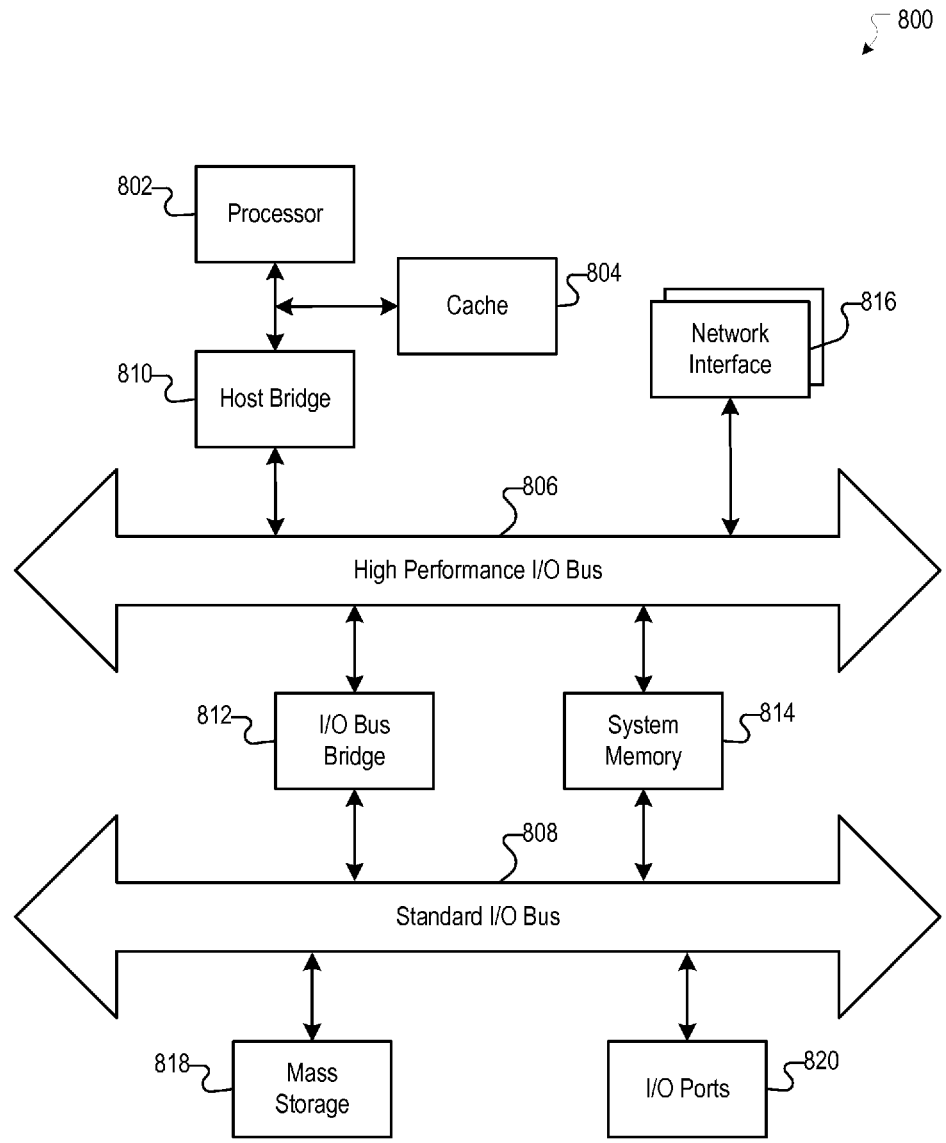
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a set of labels associated with a set of content items, each label in the set of labels being associated with at least one content item in the set of content items;
   determining, by the computing system, that at least two labels, out of the set of labels, are related, the at least two labels being determined to be related based on at least one of a co-occurrence metric associated with the at least two labels or a topic similarity metric associated with the at least two labels;
   selecting, by the computing system, a first label, out of the at least two labels, as being representative of the at least two labels; and
   replacing, by the computing system, a second label of the at least two labels with the first label based on the selecting the first label as being representative of the at least two labels,
   wherein
   the first label is selected as being representative of the at least two labels based on social engagement metrics for the at least two labels, and further wherein
   the social engagement metrics for each label are determined based on at least one of: a number of times the label has been posted in a social networking system, a quantity of user interactions associated with the label, and a quantity of distinct users who have utilized the label.

2. The computer-implemented method of claim 1, wherein the at least two labels are determined to be related based on the co-occurrence metric, and wherein determining that the at least two labels are related further comprises:
   identifying each particular content item, out of the set of content items, that is associated with the at least two labels;
   incrementing, for each particular content item that is associated with the at least two labels, the co-occurrence metric associated with the at least two labels; and
   determining that the co-occurrence metric at least meets a specified co-occurrence threshold.

3. The computer-implemented method of claim 1, wherein the at least two labels are determined to be related based on the co-occurrence metric, and wherein determining that the at least two labels are related further comprises:
   determining a number of times in which a first label and a second label, out of the at least two labels, are associated with a node in a social graph of a social networking system;
   incrementing, based on the number of times, the co-occurrence metric associated with the at least two labels; and
   determining that the co-occurrence metric at least meets a specified co-occurrence threshold.

4. The computer-implemented method of claim 3, wherein the node is associated with at least one of a particular label, a particular content item, a particular entity, a particular page, a particular group, a particular event, or a particular place.

5. The computer-implemented method of claim 1, wherein the at least two labels are determined to be related based on the topic similarity metric, and wherein determining that the at least two labels are related further comprises:
   acquiring textual information associated with the set of content items;
   determining, based on the textual information, a set of topic distributions for the set of content items, the set of topic distributions including a first topic distribution for a first content item in the set of content items and a second topic distribution for a second content item in the set of content items;
   associating the first topic distribution with a first label out of the at least two labels and the second topic distribution with a second label out of the at least two labels, the first label being descriptive of the first content item and the second label being descriptive of the second content item;
   calculating the topic similarity metric based on comparing the first topic distribution and the second topic distribution; and determining that the topic similarity metric at least meets a specified topic similarity threshold.

6. The computer-implemented method of claim 5, wherein the textual information associated with the set of content items includes at least one of a respective caption for each content item in the set of content items or a respective description for each content item in the set of content items.

7. The computer-implemented method of claim 1, further comprising:
providing a suggestion to utilize the first label.

8. The computer-implemented method of claim 1, wherein the set of labels includes a set of hashtags.

9. The computer-implemented method of claim 8, wherein the set of hashtags are determined to be trending with respect to at least one of a specified time period or a specified recent hashtag amount.

10. A system comprising:
at least one processor; and
a memory storing instructions that, when executed by the at least one processor, cause the system to perform:
acquiring a set of labels associated with a set of content items, each label in the set of labels being associated with at least one content item in the set of content items;
determining that at least two labels, out of the set of labels, are related, the at least two labels being determined to be related based on at least one of a co-occurrence metric associated with the at least two labels or a topic similarity metric associated with the at least two labels;
selecting a first label, out of the at least two labels, as being representative of the at least two labels; and
replacing a second label of the at least two labels with the first label based on the selecting the first label as being representative of the at least two labels,
wherein
the first label is selected as being representative of the at least two labels based on social engagement metrics for the at least two labels, and further wherein
the social engagement metrics for each label are determined based on at least one of: a number of times the label has been posted in a social networking system, a quantity of user interactions associated with the label, and a quantity of distinct users who have utilized the label.

11. The system of claim 10, wherein the at least two labels are determined to be related based on the co-occurrence metric, and wherein determining that the at least two labels are related further comprises:
identifying each particular content item, out of the set of content items, that is associated with the at least two labels;
incrementing, for each particular content item that is associated with the at least two labels, the co-occurrence metric associated with the at least two labels; and
determining that the co-occurrence metric at least meets a specified co-occurrence threshold.

12. The system of claim 10, wherein the at least two labels are determined to be related based on the co-occurrence metric, and wherein determining that the at least two labels are related further comprises:
determining a number of times in which a first label and a second label, out of the at least two labels, are associated with a node in a social graph of a social networking system;
incrementing, based on the number of times, the co-occurrence metric associated with the at least two labels; and
determining that the co-occurrence metric at least meets a specified co-occurrence threshold.

13. The system of claim 10, wherein the at least two labels are determined to be related based on the topic similarity metric, and wherein determining that the at least two labels are related further comprises:
acquiring textual information associated with the set of content items;
determining, based on the textual information, a set of topic distributions for the set of content items, the set of topic distributions including a first topic distribution for a first content item in the set of content items and a second topic distribution for a second content item in the set of content items;
associating the first topic distribution with a first label out of the at least two labels and the second topic distribution with a second label out of the at least two labels, the first label being descriptive of the first content item and the second label being descriptive of the second content item;
calculating the topic similarity metric based on comparing the first topic distribution and the second topic distribution; and
determining that the topic similarity metric at least meets a specified topic similarity threshold.

14. The system of claim 10, wherein the set of labels includes a set of hashtags.

15. A non-transitory computer-readable storage medium including instructions that, when executed by at least one processor of a computing system, cause the computing system to perform a method comprising:
acquiring a set of labels associated with a set of content items, each label in the set of labels being associated with at least one content item in the set of content items;
determining that at least two labels, out of the set of labels, are related, the at least two labels being determined to be related based on at least one of a co-occurrence metric associated with the at least two labels or a topic similarity metric associated with the at least two labels;
selecting a first label, out of the at least two labels, as being representative of the at least two labels; and
replacing a second label of the at least two labels with the first label based on the selecting the first label as being representative of the at least two labels,
wherein
the first label is selected as being representative of the at least two labels based on social engagement metrics for the at least two labels, and further wherein
the social engagement metrics for each label are determined based on at least one of: a number of times the label has been posted in a social networking system, a quantity of user interactions associated with the label, and a quantity of distinct users who have utilized the label.

16. The non-transitory computer-readable storage medium of claim 15, wherein the at least two labels are determined to be related based on the co-occurrence metric, and wherein determining that the at least two labels are related further comprises:

identifying each particular content item, out of the set of content items, that is associated with the at least two labels;

incrementing, for each particular content item that is associated with the at least two labels, the co-occurrence metric associated with the at least two labels; and determining that the co-occurrence metric at least meets a specified co-occurrence threshold.

17. The non-transitory computer-readable storage medium of claim 15, wherein the at least two labels are determined to be related based on the co-occurrence metric, and wherein determining that the at least two labels are related further comprises:

determining a number of times in which a first label and a second label, out of the at least two labels, are associated with a node in a social graph of a social networking system;

incrementing, based on the number of times, the co-occurrence metric associated with the at least two labels; and determining that the co-occurrence metric at least meets a specified co-occurrence threshold.

18. The non-transitory computer-readable storage medium of claim 15, wherein the at least two labels are determined to be related based on the topic similarity metric, and wherein determining that the at least two labels are related further comprises:

acquiring textual information associated with the set of content items;

determining, based on the textual information, a set of topic distributions for the set of content items, the set of topic distributions including a first topic distribution for a first content item in the set of content items and a second topic distribution for a second content item in the set of content items;

associating the first topic distribution with a first label out of the at least two labels and the second topic distribution with a second label out of the at least two labels, the first label being descriptive of the first content item and the second label being descriptive of the second content item;

calculating the topic similarity metric based on comparing the first topic distribution and the second topic distribution; and determining that the topic similarity metric at least meets a specified topic similarity threshold.

19. The non-transitory computer-readable storage medium of claim 15, wherein the set of labels includes a set of hashtags.

* * * * *